United States Patent [19]

Sangeeta et al.

[11] Patent Number: 5,628,938
[45] Date of Patent: May 13, 1997

[54] METHOD OF MAKING A CERAMIC COMPOSITE BY INFILTRATION OF A CERAMIC PREFORM

[75] Inventors: D. Sangeeta, Niskayuna; Svante Prochazka, Ballston Lake; Krishan L. Luthra, Niskayuna, all of N.Y.

[73] Assignee: General Electric Company, Schenectady, N.Y.

[21] Appl. No.: 342,483

[22] Filed: Nov. 18, 1994

[51] Int. Cl.⁶ ................................................. B05B 3/00
[52] U.S. Cl. ........................ 264/28; 264/628; 264/670
[58] Field of Search .................... 264/28, 29.6, 29.7, 264/62; 427/228, 314

[56] References Cited

U.S. PATENT DOCUMENTS

| | | | |
|---|---|---|---|
| 2,869,215 | 1/1959 | Smith | 25/156 |
| 3,177,161 | 4/1965 | Smith-Johannsen | 252/502 |
| 3,512,571 | 5/1970 | Phelps | 264/28 |
| 3,859,421 | 1/1975 | Hucke | 423/445 |
| 4,120,731 | 10/1978 | Hillig et al. | 106/44 |
| 4,122,041 | 10/1978 | Mahler | 252/449 |
| 4,141,948 | 2/1979 | Laskow et al. | 264/101 |
| 4,148,894 | 4/1979 | Hillig et al. | 428/242 |
| 4,238,433 | 12/1980 | Hillig et al. | 264/60 |
| 4,240,835 | 12/1980 | Laskow et al. | 106/44 |
| 4,320,079 | 3/1982 | Minnear et al. | 264/102 |
| 4,569,920 | 2/1986 | Smith-Johannsen | 264/28 |
| 4,722,817 | 2/1988 | Nakano et al. | 264/29 |
| 4,772,524 | 9/1988 | Coblenz | 428/699 |
| 4,889,686 | 12/1989 | Singh | 419/13 |
| 4,935,199 | 6/1990 | Nishio et al. | 264/60 |
| 4,944,904 | 7/1990 | Singh et al. | 269/60 |
| 4,981,822 | 1/1991 | Singh et al. | 501/95 |
| 5,015,540 | 5/1991 | Borom et al. | 428/698 |
| 5,021,367 | 6/1991 | Singh et al. | 501/88 |
| 5,043,303 | 8/1991 | Singh et al. | 501/90 |
| 5,047,181 | 9/1991 | Occhionero et al. | 264/28 |
| 5,303,763 | 4/1994 | Aghajanian et al. | 164/97 |
| 5,306,676 | 4/1994 | Johnson | 501/88 |
| 5,308,422 | 5/1994 | Askay et al. | 156/89 |

OTHER PUBLICATIONS

CRC Handbook of Chemistry and Physics, 1978–1979, p. D–231.

Si/SiC Ceramic Composites: Properties and Applications, RL Mehan, et al., Proceedings of the 4th Annual Conf. on Comp. & Adv. Mat'ls., Issue No. 7–8(B), 1980, pp. 405–419.

Tailoring of Si/SiC Composites for Turbine Applications, WB Hillig, Proceedings of the 4th Annual Conf. on Comp. & Adv. Mat'ls., Issue No. 7–8(B), 1980, pp. 989–1000.

Silicon/Silicon Carbide Composites, WB Hillig, et al., General Electric Company, Corporate Research and Dev., Manuscript 74CRD282, Nov. 1974.

(List continued on next page.)

*Primary Examiner*—Christopher A. Fiorilla
*Attorney, Agent, or Firm*—Noreen C. Johnson; William H. Pittman

[57] ABSTRACT

A method for making a composite ceramic article by infiltration of a sintered ceramic preform with an infiltrate phase. The ceramic preform is made by directionally solidifying a liquid medium containing a dispersion of ceramic particles to produce a green, porous ceramic preform a plurality of interconnected lamelli that are partially separated from one another by complementary interlamellar regions, removing the solidified liquid medium and sintering the ceramic preform. This method may be used to make silicon carbide composites where a silicon carbide preform is first infiltrated with carbon to coat the lamelli of the preform, followed by infiltration of the carbon coated preform with molten silicon, whereby the molten silicon and carbon react to form silicon carbide in the interlamellar regions. The ceramic preform may also be coated with a thin, diffusion-inhibiting ceramic layer prior to infiltration in order to prevent interdiffusion between the lamelli of the preform and the infiltrate phase, and provide a plurality of mechanically weak, crack deflecting interfaces within the composite article.

20 Claims, 5 Drawing Sheets

OTHER PUBLICATIONS

Silicon/Silicon Carbide Composites, WB Hillig et al., pp. 1054–1056, Ceramic Bulletin, Amer. Cer. Society's Fall Mtg., Sep. 30,1974 (15–BN–74F).

High–Temperature Time–Dependent Strength of an Si/SiC Composite, GG Trantina, et al., Journal of the Americal Ceramic Society, pp. 177–178, vol. 60, No. 34, Mar.–Apr. 1977.

Anisotropic Behavior of Si/SiC Composites, RL Mehan, Am. Ceram. Soc. Bulletin, vol. 56, pp. 211–212, 1977.

Effect of SiC Content and Orientation on the Properties of Si/SiC Ceramic Composite, RL Mehan, Journal of Mat. Sci. 13(1978) pp. 358–366.

The Application of Silcomp Composite Materials to Turbine Systems, WB Hillig, Selective Application of Mat. for Prod. & Energy, vol. 23, Sci. of Adv. Mat. & Process Engrg. Series, pp. 633–641, May 1978.

Studies on the Sintering Behaviour of SiC with Polycarbosilane Binding Agents, AM Hurtado & Z. Alkan, Ceramics International 19 (1993), pp. 327–331.

Freeze–formed silica fibres, W. Mahler et al., Nature, V.285, No. 5759, May 1, 1980 (pp.27–28).

METHOD OF MAKING A CERAMIC COMPOSITE BY INFILTRATION OF A CERAMIC PREFORM

FIELD OF THE INVENTION

The present invention is related generally to ceramic composites. In particular, it is related to ceramic composites comprising a porous, sintered ceramic preform and an infiltrate phase filling the pores of the ceramic preform. The invention is also related to a method of making ceramic articles by forming a porous, sintered ceramic preform comprising an interconnected network of lamelli with interlamellar spaces and infiltrating the interlamellar spaces of the preform with an infiltrate phase.

BACKGROUND OF THE INVENTION

In general, ceramics articles are highly desired for many applications, particularly high temperature structural applications, due to their refractoriness and high-temperature strength. However, the poor damage tolerance of monolithic ceramics limits their use. Ceramic composites like continuous fiber ceramic composites (CFCCs) are extremely damage tolerant and are materials of choice for high temperature structural applications, however, high manufacturing costs have severely restricted their use.

Low cost, readily producible lamellar or fibrillar ceramic composite structures are of interest for many potential applications. They may potentially be used for non-structural applications like catalyst supports, heat exchangers, thermal insulation, filters and many others, based upon characteristics such as their substantial surface-to-volume ratio and low density as compared to metals. Such materials also have potential application as structural materials, including high temperature structural materials, where their physical properties and microstructure may be used to distribute localized stresses and provide high temperature strength.

Lamellar and fibrillar minerals occur naturally, such as mica and asbestos, and have been commonly used as fillers and reinforcements in various composite materials. However, these naturally occurring mineral forms are not suitable for all applications (e.g. applications which require non-naturally occurring morphologies) hence, considerable efforts have been made to synthesize lamellar and fibrillar ceramic materials. Fiberglass is a common glassy ceramic material produced artificially for this purpose.

There is much interest currently in the synthesis of lamellar and fibrillar ceramics for incorporation into ceramic composites, particularly high temperature structural ceramic composites. These lamellar or fibrillar refractory ceramics, such as alumina, silicon carbide, aluminum silicate and others, currently are synthesized in a number of ways. For example, ceramic lamelli or fibers are currently formed by known methods including: whisker growth by the VLS (Vapor-Liquid-Solid) process, CVD (chemical vapor deposition) on a fiber core, spinning of polymeric ceramic precursor or gel fibers followed by pyrolytic conversion to ceramic fibers, melt spinning of molten ceramics and extrusion and spinning of plasticized ceramic powders followed by sintering.

These refractory lamellar and fibrillar ceramic structures are frequently fabricated into composite articles by combination with other materials usually designated as a matrix. These lamellar or fibrillar ceramic structures are utilized to provide reinforcement to the matrix, and are utilized because of their high strength and high elastic modulus at high temperatures.

The process of separately fabricating lamellar or fibrillar ceramic structures, particularly refractory ceramics structures, and their later conversion into bonded composites frequently includes many costly process steps. Therefore, it is desirable to develop new composite ceramics articles, and methods for making them, having lamellar and fibrillar structures for reinforcement that avoid technical and cost limitations associated with present methods and materials.

SUMMARY OF THE INVENTION

The present invention is a composite ceramic article comprising a porous, sintered, monolithic ceramic preform that in turn comprises a plurality of interconnected lamelli that are partially separated from one another by complementary interlamellar regions, and an interpenetrating infiltrate phase formed in the interlamellar regions.

The invention may also be described as a method for making a composite ceramic article, comprising the steps of: forming a porous, sintered, monolithic ceramic preform which comprises a plurality of interconnected lamelli that are partially separated from one another by complementary interlamellar regions, and infiltrating the interlamellar regions with an infiltrate phase. The sintered ceramic preform may be made by the steps comprising: forming a colloidally stabilized liquid dispersion comprising a plurality of ceramic particles and a liquid medium, wherein the ceramic particles are at least temporarily dispersed within the liquid medium; cooling the dispersion to a temperature below a freezing point of the liquid medium for a time sufficient to cause the directional solidification of the liquid medium and progressive segregation of the liquid medium from the dispersion, wherein the directional solidification and segregation of the liquid medium causes the morphological ordering of the plurality of the ceramic powder particles into a lamellar or fibrillar ceramic powder aggregate; removing the frozen liquid medium to obtain a ceramic article in a green-state; and heating the article at a temperature and for a time sufficient to cause the plurality of ceramic particles to become sintered to one another.

The ceramic composites of this invention may be made from any mutually compatible combination of ceramic preform and infiltrate phase. However, Applicants believe that particularly advantageous composites will include refractory composites, such as for example those comprising a silicon carbide preform and an infiltrate phase comprising silicon carbide. Such an infiltrate phase may be formed by infiltrating carbonaceous resins into the interlamellar regions and pyrolizing them to produce a carbon residue, followed by infiltrating the interlamellar regions with molten silicon to react with the carbon and form a phase comprising a silicon and silicon carbide. The amount of carbon residue, and hence the amount of silicon carbide formed, may be varied by altering the resin materials and infiltration techniques.

Another advantage of the present invention is that nature of the steps used to make the preform permit the preform to be made into many desired final shapes directly, and hence the ceramic composite potentially may be made to approximately final shapes as well.

Another advantage of the present invention is that the lamelli of the ceramic preform may be coated with a thin layer of a ceramic or other material, such as are well-known in the ceramic arts, to inhibit the sintering or strong bonding of the ceramic preform and the infiltrate phase and to create a mechanically weak interface between these materials, so as to promote the deflection of cracks propagating from the infiltrate phase or the ceramic preform into this thin layer and prevent the extension of cracks in either direction between the ceramic preform and the infiltrate phase.

This patent application is related to co-pending patent application Ser. No. 08/342,482, filed on Nov. 18, 1994.

DETAILED DESCRIPTION OF THE INVENTION

Applicants have determined that ceramic composite articles can be formed which comprise a porous, sintered ceramic preform and an infiltrate phase, and herein describe such articles and steps for making them. The porous, sintered ceramic preform comprises a plurality of sintered, interconnected lamelli. The ceramic preform is porous, because of the fact that these lamelli, while interconnected, are also partially spaced apart, creating interlamellar spaces or regions. These interlamellar regions can be filled with an infiltrate phase, such as a ceramic infiltrate phase, so as to produce a fully-dense, ceramic article. The result is a fully-dense, composite ceramic article having two primary phases, one comprising the original ceramic preform, and the other comprising the infiltrate phase. These composite ceramic articles also may comprise additional features, such as layers located between the outer surfaces of the lamelli of the ceramic preform and the infiltrate phase that are intended to inhibit their bonding or sintering to each other and to serve as crack deflecting interfaces in order to lessen the likelihood of a crack originating in one phase and propagating into the other.

Figure 1:
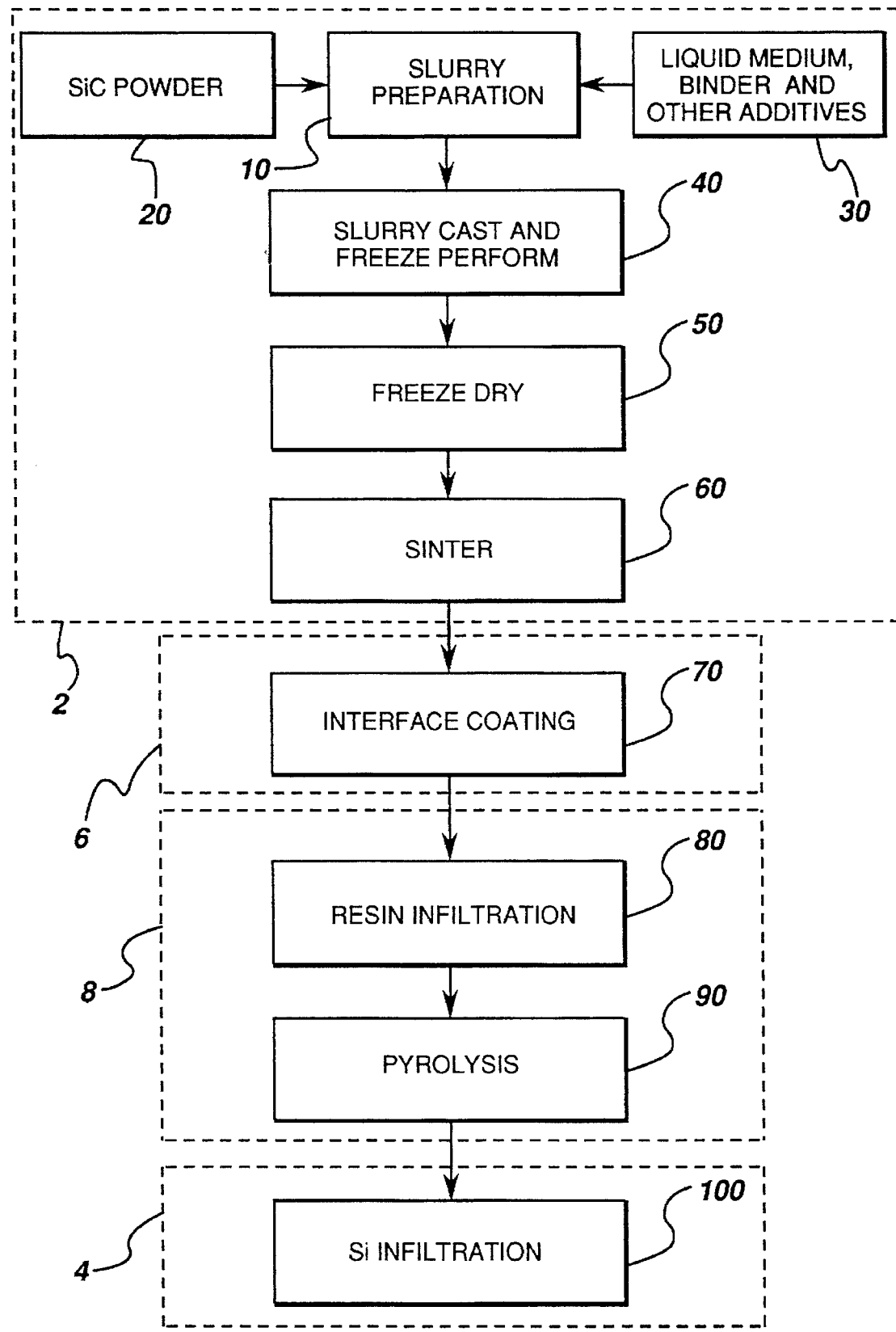
FIG. 1 is a flow chart of a method used to make a ceramic article of the present invention.

Referring to FIG. 1, composite ceramic articles of the present invention may be made by the steps generally comprising: forming a porous, sintered, monolithic ceramic preform comprising a plurality of interconnected lamelli that are partially separated from one another by complementary interlamellar regions 2; and infiltrating the interlamellar regions with an infiltrate phase 4. While these steps describe the preform as comprising a plurality of lamelli, it will be seen herein that such preform may also comprise a plurality of fibrils, or a mixture of lamelli and fibrils. It may also be desirable to perform the step of coating the plurality of lamelli with a thin ceramic layer 6 prior to the step of infiltrating the interlamellar regions, wherein the ceramic layer covers the plurality of lamelli and later inhibits sintering or bonding between the plurality of lamelli and the infiltrate phase during the step of infiltrating the interlamellar region. It may also be desirable to infiltrate a precursor material 8 within the interlamellar regions prior to the step of infiltrating the interlamellar regions with an infiltrate phase, so as to further control the composition or morphology of the resultant infiltrate phase. FIG. 1 also illustrates a more specific example of steps for making a silicon carbide-based composite ceramic of the present invention in steps 10, 20, 30, 40, 50, 60, 70, 80, 90 and 100. These general and more specific steps and the resultant composite ceramic articles are described in greater detail below.

The step of forming 2 a porous, sintered, monolithic ceramic preform comprising a plurality of interconnected lamelli that are partially separated from one another by complementary interlamellar regions is described in the referenced co-pending patent application. This referenced application for patent describes lamellar and fibrillar ceramics articles that may be sintered to form the preform necessary to make composite ceramic articles of the present invention.

A lamellar or fibrillar ceramic article in a green state is made by the steps, comprising: forming a liquid dispersion comprising a plurality of ceramic particles and a liquid medium, wherein the ceramic particles are at least temporarily dispersed in the liquid medium by action of the dispersant; cooling the dispersion to a temperature below a freezing point of the liquid medium for a time sufficient to cause directional solidification within the liquid medium and progressive segregation of the liquid medium from the dispersion; wherein the directional solidification and segregation of the liquid medium causes the morphological ordering of the plurality of the ceramic powder particles into a lamellar or fibrillar ceramic powder aggregate; and removing the frozen liquid medium to obtain a ceramic article in the green state. In the case of making a sintered preform, the steps further comprise the step of heating the green ceramic article at a temperature and for a time sufficient to cause the ceramic particles to become sintered to one another, in order to transform the ceramic article from a green state to a sintered state.

The step of forming the dispersion is known to those familiar with the ceramic arts and mineral processing, in that it is analogous to the formation of ceramic slips or mineral slurries. A fine ceramic powder is utilized as a source of ceramic particles. Any ceramic powder that will form a stable dispersion in a liquid medium may be used, however, Applicants believe that in order to stabilize the dispersion it is preferred that the median particle size be in the range of about 0.2 to 5.0 microns, and that the maximum particle size be about 10 microns or less. In order to assist subsequent sintering, it may also be desirable to further control the particle size. For example, Applicants believe that for silicon carbide and alumina the median particle size to promote sintering should be in the range of about 0.2 to 1.0 microns. The liquid medium may be any liquid medium in which a dispersion of ceramic particles may be formed. The liquid medium should be compatible with the steps to be utilized for cooling and removal of the liquid medium. In particular, if it is desired that the frozen liquid medium be removed by sublimation, the liquid medium may be selected so as to have a vapor pressure at or just below the melting point that permits removal of the medium at a reasonable rate, so as to be commercially viable. Applicants believe that liquid media having a vapor pressure at their melting points of at least 0.1 torr are preferred if sublimation is to be used in the step of removing the liquid medium. Liquid media such as water, cyclohexane, tertiary butylalcohol and carbon tetrachloride may be used in such a case. It may also be desirable to utilize solutions of these or other liquid media so as to enhance the ability of the liquid medium to be directionally solidified, or to enhance the morphology of the directionally solidified liquid medium, or to promote sublimation, or to tailor the resultant microstructure and its density, or for other purposes. Known principles of solidification of pure liquids and solutions may be employed to select the liquid medium in light of the fact that the morphology of the directionally solidified liquid medium together with the concentration of the ceramic particles dispersed within this medium defines in large part the morphology of the resultant ceramic articles, as described further below. The dispersion should be a colloidally stabilized dispersion, because Applicants have observed that when a colloidally stabilized heavy dispersion of a fine ceramic powder or powders in a liquid medium (i.e. a slurry) is frozen, that the ceramic powder or powders assume lamellar, fibrillar or combined lamellar/fibrillar morphologies corresponding to certain ranges of ceramic particle concentration in the dispersion, in which lamelli of the frozen liquid medium alternate with lamelli or fibrils of the ceramic powder particles. Therefore, a dispersant or deflocculant is preferably used in most cases to colloidally stabilize the dispersion of the ceramic particles in the liquid medium, unless the ceramic particles are naturally dispersed within the liquid medium in which case a dispersant is not necessary. Any dispersant that stabilizes the dispersion, and that is compatible with the other steps used to form the ceramic article as well as the intended applications of the resultant ceramic articles may be used. Basically, these dispersants operate by developing a like charge on the plurality of ceramic particles in the liquid medium, thereby causing the particles to repel each other such that the particles do not agglomerate or coagulate and settle-out of the liquid medium. Dispersants may be categorized generally by the way in which they create the like charge on the ceramic particles. Polar dispersants incorporate polar molecules to create the necessary charge field. Highly polar, ionic dispersants utilize ions to create the necessary charge field around the ceramic particles. The use of dispersants generally and the types of useful dispersants for many particular ceramic particles are well-known. For example, with silicon carbide particles in deionized water, Polyfon H, a sodium lignosulphonate compound made by Westvaco and TMAH (tetramethyl ammonium hydroxide) have been used as a dispersant. In the case of alumina particles in deionized water, nitric acid has been used as a dispersant. In the case of silicon carbide particles in a tertiary butylalcohol liquid medium, a combination of Hypermer KD1, an anionic dispersant made by ICI Americas, and Emcol CC 42, a non-ionic (but slightly polar) dispersant made by Witco Corp., have been used as the dispersant.

Binding agents or binders may also be incorporated into the dispersion or applied to the particles prior to forming the dispersion. The use of, purposes for, and materials comprising binders to develop green state ceramic articles is well-known in the ceramic arts. Briefly, binders have numerous purposes, the principal one typically being to permit a plurality of ceramic particles to be formed into a cohesive shape prior to sintering the particles together. A principal reason for the use of binders in the present invention is also to give cohesion to the resultant particle morphologies. Binders may also act as a sintering agent in the case of some types of ceramic particles. For example, carbonaceous binders are known to act as sintering agents in addition to providing cohesive strength to green articles formed from silicon carbide. A binder should be selected so as to take into consideration potential interaction with the ceramic particles during sintering. Binders may be particularly useful when larger particle sizes are utilized. Examples in the case of the present invention include: sucrose and glycerin with silicon carbide particles in a deionized water liquid medium; aluminum hydrate with alumina particles in a deionized water liquid medium; and novolac resin with silicon carbide particles in a tertiary butylalcohol liquid medium. Further, Applicants have observed that when silicon carbide ceramic powders are used that the use of certain polycarbosilanes and polysilazanes as binders is useful, such as polydimethyldiphenylcarbosilane, hydropolycarbosilane, poly-(diphenylsilane-(co-dimethyl)-(co-methylene)), n-methylsilazane and 50% dimethylsilane–50% phenylmethylsilane (by weight) copolymer. These binders have been found to increase the density of the resultant lamellar and fibrillar ceramic structures, and they also seem to promote the development of coarser lamelli and fibrils during directional solidification. Polycarbosilane and polysilazane binders are particularly useful with organic liquid media in which they are soluble. However, it is also believed that they may be used with aqueous liquid media by applying them to the ceramic particles prior to forming the dispersion.

Sintering agents may also be incorporated into the dispersion. The use of, purposes for, and materials comprising sintering agents are well-known in the ceramic arts. As examples in the case of the present invention, boron powder has been used in the case of silicon carbide particles in a deionized water liquid medium, magnesium aluminate has been used in the case of alumina particles in a deionized water liquid medium, and boron carbide has been used in the case of silicon carbide in a tertiary butylalcohol liquid medium.

Surfactants may also be added to the liquid medium to enhance the ability of the liquid medium to wet the surfaces of the ceramic particles, and thus assist in the formation of a stable dispersion. In this sense, they aid in the formation of the dispersion by serving as detergents to increase the wetability of the particles in the liquid medium, rather than effecting the electrical charge balance between adjacent ceramic particles as is typical of the types of dispersants described above.

It is preferred that binders, dispersants and sintering agents not crystallize upon cooling, so as to not interfere with the morphology of the liquid medium as it freezes, however, whether such additives may crystallize upon freezing depends on the degree to which such crystallization interferes with such morphology. Depending on the degree of interference and the intended use of the ceramic article, such additives may include materials that crystallize upon freezing.

Figure 2:
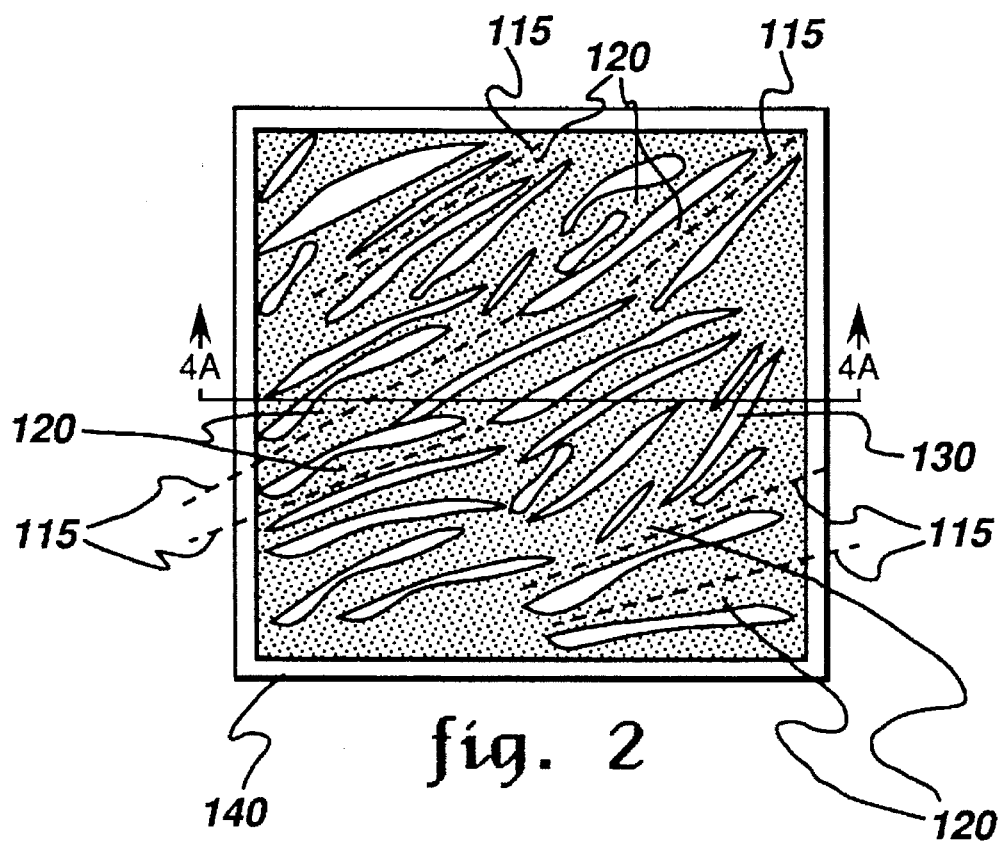
FIG. 2 is a schematic top view of a lamellar ceramic preform.
Figure 2A:
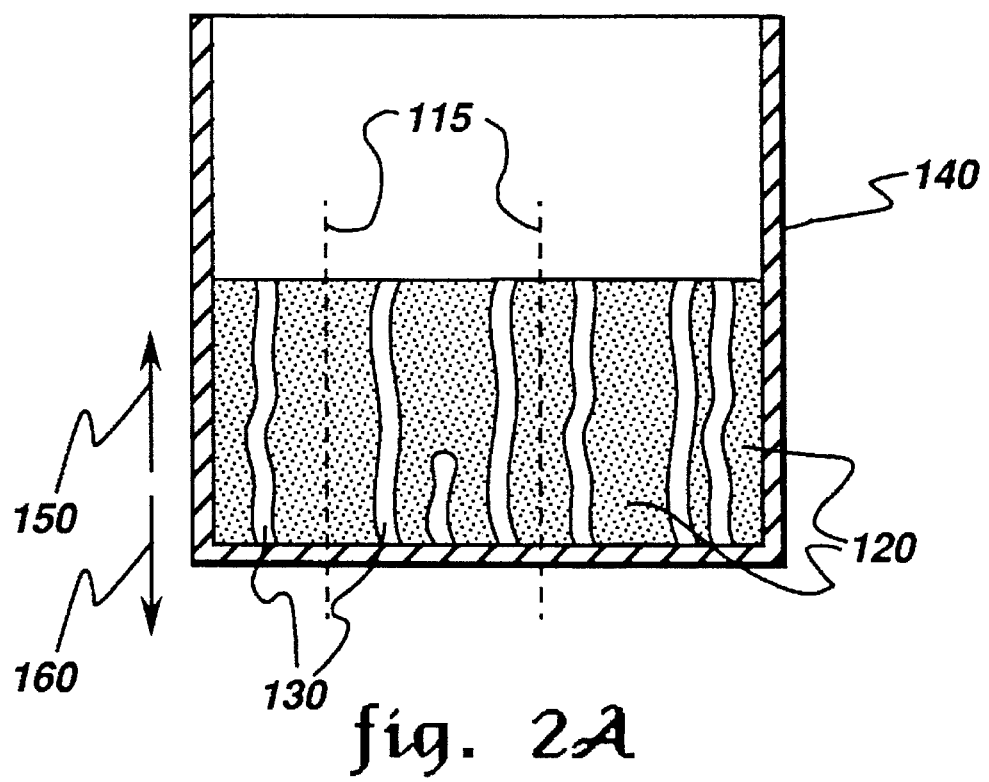
FIG. 2A is a schematic cross-sectional view of the lamellar ceramic preform of FIG. 2.

Following the step of forming the dispersion is the step of cooling the dispersion to a temperature below the freezing point of the liquid medium in a manner and for a time sufficient to cause the directional solidification of the liquid medium and progressive segregation of the liquid medium from the dispersion; wherein the directional solidification and segregation of the liquid medium causes the morphological ordering of the plurality of the ceramic powder particles into a lamellar or fibrillar ceramic powder aggregate. Known methods and means for cooling may be employed to promote directional solidification of the liquid medium. So long as the freezing conditions are controlled to remove the heat in a preferred direction, the lamelli and fibrils grow by directional solidification of the liquid medium and the progressive segregation of the liquid medium from the remaining dispersion. Applicants also believe that the heat may be removed in a plurality of preferred directions from a dispersion, and that such cooling would promote directional solidification and the progressive segregation of the liquid medium from the remaining dispersion in a plurality of directions, and thus affect the morphological ordering of the ceramic particles as discussed further below. This progressive segregation which continues throughout the solidification process concentrates the remaining dispersion and compacts the ceramic particles in the spaces between the dendrites of the solidified liquid medium. Referring to FIGS. 2 and 2A, based on known principles of directional solidification, the preferred direction of heat removal 160 is opposite the direction in which the lamelli are to be formed 150. Thus the lamelli or fibrils are aligned parallel to the direction of the heat flow. The nature of the process by which the lamelli and fibrils are formed is similar to phase separation, and it is analogous to the directional solidification of, for example, metal alloys. Upon cooling, the pure liquid medium first nucleates and crystallizes, thereby depleting the remaining dispersion of the pure liquid and leaving a dispersion with a lower concentration of liquid medium and a higher concentration of solute atoms (such as solute atoms from a dispersant used to colloidally stabilize the dispersion or a soluble binder), and thus a depressed solidification temperature as compared to that of the pure liquid medium. The difference between the freezing temperature of the pure liquid medium and the dispersion (which continues to change in concentration) during the course of the freezing process may be only a few tenths of a degree or may be many degrees, depending on the chemistry of the system, particularly on the concentration and nature of solutes (e.g. dispersants, binders) in the liquid. The spacing and the morphology of the crystallized liquid medium defines the shape of the space containing the remaining concentrated dispersion, and thus the shape of the lamelli or fibrils which result when the remaining concentrated dispersion ultimately freezes upon further decreases in the temperature. The lamelli or fibrils have the approximate shape of the interstitial spaces within the directionally solidified liquid, and the dendrites of the directionally solidified liquid in turn define the size and shape of the interlamellar or interfibrillar spaces.

As the pure liquid medium is segregated from the dispersion during directional solidification, the solid concentration in the dispersion increases. As a consequence, dispersions with a very high volume fraction of solids form. In such highly concentrated dispersions, as more of the pure liquid medium is progressively removed or segregated by freezing, it is believed that strong capillary forces are at work at the interfaces which compress the ceramic particles together. These forces in turn form green ceramic articles having lamellar and fibrillar morphologies with high packing densities.

The morphologies of the ceramic powder aggregates (e.g. a lamella or fibril) formed in the frozen dispersions are dominated by the concentration of ceramic particles in the dispersion and by the morphology of the directionally solidified liquid medium. The aggregate morphologies formed range from a plurality of substantially disconnected fibrils or lamelli to structures comprising a plurality of substantially interconnected lamelli. The term substantially is used to denote the fact that some variations in morphology may occur in these ceramic articles even when a particular morphology is predominant. For example, in the case of silicon carbide and alumina ceramic powders in several organic and aqueous liquid media, at lower volume fractions, between about 15 to 25 volume percent of ceramic particles, mostly fibrillar morphologies were observed, frequently with polygonal cross-sections of the individual fibrils. For these dispersions, there was an intermediate concentration, at about 25 volume percent of ceramic particles, where both morphologies occur together forming frequently ribbed platelets or polygonal fibers linked by thin walls. When these silicon carbide and alumina dispersions had about 25 to 45 volume percent of ceramic particles, mostly lamellar morphologies resulted. At very high concentrations, such as about 45 to 55 volume percent of ceramic particles, these dispersion tended to solidify as a mass of interconnected lamelli as illustrated in FIGS. 2 and 2A, in which the segregated liquid formed discrete, isolated, mostly globular interlamellar spaces between the lamelli. At the highest concentrations, such as about 60 volume percent or more of ceramic particles, no progressive segregation took place, because the dispersions could not reject any more liquid medium, and in such dispersions, the ceramic particles solidified as a single mass, rather than in the morphologies described above. In dispersions comprising other combinations of ceramic particles and liquid media, the absolute value of the ranges described above may shift, but similar morphologies are anticipated.

Referring to FIGS. 2 and 2A, in the case where heat is removed from a dispersion primarily in a single preferred direction, a lamella 120 or fibril of the present invention has a substantially longitudinal growth axis 115, and thus extends longitudinally. A lamella 120 of the present invention also has a substantially transverse axis 125 that is perpendicular to the substantially longitudinal axis 115 in the plane of the lamella. These axes are described as substantially longitudinal and substantially transverse, because the lamelli 120 or fibrils are generally not completely straight and do not form perfectly regular shapes. FIGS. 2 and 2A, represent lamelli 120 formed in dispersions with a sufficient concentration of ceramic particles to form a plurality of interconnected lamelli 120. The morphologically ordered particles comprise a plurality of longitudinally-extending, substantially planar ceramic lamelli that have substantially parallel longitudinal axes 115 and substantially non-parallel transverse axes 125, wherein adjacent lamelli 120 impinge upon and are partially interconnected with one another thereby forming an interconnected network of lamelli spaced apart by interlamellar regions 130, corresponding to regions between adjacent lamelli 120 where these lamelli 120 do not impinge upon one another. A sufficient concentration of ceramic particles to form interconnected lamelli is believed to be in the range of about 35 to 55 volume percent of all particles, including both ceramic particles and other particles (e.g. binders and sintering agents). These lamelli 120 impinge upon one another during formation, generally at their ends, thereby becoming partially interconnected and forming a network of lamelli separated by interlamellar regions 130. The longitudinal axes 125 of the plurality of lamelli are termed substantially parallel for the same reasons the term substantially is used previously with regard to their axes. However, the transverse axes 125 are substantially non-parallel, and thus the lamelli impinge upon one another in the dimension corresponding to the directions of the transverse axes. However, the lamelli 120 remain spaced apart in the longitudinal dimension, corresponding to the direction of the substantially parallel longitudinal axes. The lamelli and fibrils have varying longitudinal lengths depending on factors including the depth of the dispersion and others, and varying transverse cross-sectional shapes from nearly circular (fibrils) to generally flattened polygonal (lamelli) shapes. The diameters or lateral dimensions of the cross-sections range substantially from several micron to many tens of microns and depends on a number of factors such as the concentration of particles in the liquid medium, the rate of cooling, the viscosity of the slurry and, particularly, on the nature of the liquid medium and ingredients dissolved in the liquid, such as the dispersants used to stabilize the slurries. The width of the lamelli as measured along the transverse axis will be greater than the thickness of the lamelli which is measured perpendicular to the transverse axis. Based on known fracture mechanics considerations for lamellar composite ceramic materials, it may be desirable to design dispersions that are adapted to form lamelli that have a preferred ratio of width to thickness, on the order of about 5–10:1. Generally, the width of the lamelli observed by Applicants range from tens to thousands of microns, with average widths ranging in the hundreds of microns. The length of the lamelli as measured along the longitudinal axis is generally much greater than the width, and generally depends strongly on the depth of the dispersion in the container in which it is frozen. Applicants have observed lamelli having lengths of about 1–2 inches corresponding to the depth of the frozen dispersion from which they were formed, and it is believed that longer lamelli are possible. Therefore, the lamelli of the present invention may also be described as long ribbons or thin plates. Under proper growth conditions as described above, these ribbons or plates may impinge upon one another along their widths and become interconnected in this dimension, forming an interconnected network of spaced-apart ribbons or plates, also described herein as a plurality of interconnected lamelli.

In cases where heat is removed from the dispersion in a plurality of preferred directions, based on known principles of solidification, it is expected that directional solidification of the liquid medium will occur in a plurality of preferred directions, generally corresponding to the directions opposite the directions from which the heat is removed. In such situations, Applicants expect that the morphological ordering of the ceramic particles will also occur in a plurality of directions, such that the resulting lamelli corresponding to a particular growth direction will still be longitudinally-extending along substantially parallel longitudinal axes, but wherein the lamelli corresponding to different growth directions will have substantially non-parallel longitudinal axes. Also, where the lamelli corresponding to different growth directions impinge upon one another during their formation, Applicants expect that the resulting morphology will be interconnected.

In a preferred embodiment, the step of removing the frozen liquid medium is accomplished by its sublimation. The combination of the steps of cooling the dispersion until it freezes and removing the liquid medium is a process known as freeze drying. This is done by heating the frozen dispersion containing the frozen liquid medium at a reduced pressure (lower than atmospheric pressure) so as to supply the latent heat necessary for sublimation (latent heat of evaporation) yet not exceed the melting point of the liquid. In order for freeze drying to be done in a commercially feasible period of time, a liquid dispersion medium with relatively high vapor pressure at its melting point should be selected. For example, Applicants believe that a vapor pressure at the melting point of the frozen liquid medium should be greater than about 0.1 torr. Examples of such liquid media are water, cyclohexane, tertiary butylalcohol, carbon tetrachloride and p-xylene. When additions are made to the dispersions to modify their properties, attention should be given to their effect on the freezing behavior of the liquid so as to not depress the melting temperature too much, and thus inordinately slow the process of sublimation. Also additions may be made to a pure liquid in order to form a liquid medium having the characteristics described above.

The product obtained by freeze drying is the starting powder compacted into the morphologies discussed above. However, along with the powder particles the product may also contain ingredients, such as solutes, which have been added to the dispersion and rejected by the liquid during its segregation on freezing, binders if any have been added, and sintering agents if any have been added.

Applicants believe that the step of removing the liquid medium may also be accomplished by other means in some instances, including removal by re-melting and evaporation of the liquid medium. Another means of performing the step of removing the liquid medium may include re-melting and decanting all or a portion of the liquid medium. It is only necessary that the step of removing the liquid medium not cause the deterioration of the particle morphology or microstructure formed during freezing.

Upon removing the liquid medium, the lamellar or fibrillar ceramic powder aggregate is in a green state. It includes any binders or sintering aids that were utilized, whether applied to the ceramic particles or incorporated into the liquid medium. After removal of the liquid medium, the plurality of lamelli or fibrils are separated by complementary interlamellar or interfibrillar spaces. These interlamellar spaces are complementary in that they correspond to the spaces formerly occupied by the frozen liquid medium which, as described above, originally defined the shape of the lamelli or fibrils. In the case of lamellar ceramic articles formed from dispersions having volume fractions of ceramic particles sufficient to form an interconnected network of lamelli, the interlamellar spaces are primarily discrete, longitudinally-extending spaces as shown in FIGS. 2 and 2A. In the case of ceramic articles formed from dispersions having lower concentrations of ceramic particles such that the lamelli or fibrils do not impinge on one another during their formation, the interlamellar space is primarily continuous.

The green freeze dried lamellar or fibrillar product may be sintered directly by the step of heating the article at a temperature and for a time sufficient to cause the plurality of ceramic particles to become bonded to one another. Various known techniques of sintering may be employed, depending on the ceramic materials chosen, and the presence of dispersants, as well as any binders and sintering agents.

As described above, the step of forming the ceramic preform 2 is followed by the step of infiltrating the infiltrate phase 4 into the interlamellar regions. This infiltrate phase may be any material that is capable of being infiltrated into the preform and that is compatible with the ceramic preform. This may include ceramic, metallic, intermetallic or other compatible materials, and may comprise materials that are comparatively mechanically weak or strong. In addition, it may be desirable for the infiltrate phase to be either weakly or strongly bonded to the ceramic preform. Compatibility will be determined primarily by the intended application of the desired composite ceramic articles. For example, in the case of structural composite ceramics (i.e. where toughness and/or strength is a significant application requirement) where the infiltrate phase is a metal, it may be desirable for the infiltrate phase to be strongly bonded to the ceramic preform. However, in the case of structural ceramic composites where the infiltrate phase is a ceramic, it may be desirable that a relatively weaker interface exist between the ceramic preform and the infiltrate phase, such as for the purpose of preventing the propagation of cracks between the phases. Compatibility may also include other known considerations, such as the mismatch in thermal expansion coefficient between the respective preform and infiltrate, differences in corrosion potential, interdiffusion considerations and others. Any suitable method of infiltrating the infiltrate phase may be utilized, including infiltration of a molten liquid, chemical vapor deposition, infiltration of a liquid precursor and subsequent conversion to from the infiltrate phase and others.

While many types of composite ceramic articles of the present invention are possible, Applicants believe that structural composite ceramic articles will be particularly useful. Silicon carbide composites ceramics may be particularly useful for high temperature structural applications. Such composites may comprise a silicon carbide preform and an infiltrate phase which also comprises silicon carbide, as described in the examples below. For some SiC (preform)/SiC (infiltrate) composites, it is preferable that the infiltrate phase comprise as large a volume fraction of silicon carbide as possible, most preferably a volume fraction of 1, and that the silicon carbide of this phase be continuous. It is also preferred for such composites that the coefficient of thermal expansion mismatch be minimized in order to minimize thermal change induced stresses and the possibility of internal crack propagation. Preferably in such silicon carbide composites, the thermal expansion mismatch would be zero, however, it is believed that useful structural composite silicon carbide based ceramics may be made where the mismatch in the coefficient of thermal expansion between the interpenetrating phases is relatively small, on the order of about $3 \times 10^{-6}$ in./in. °C. In the case of silicon carbide composites, a silicon carbide preform may be infiltrated by an infiltrate phase comprising silicon carbide created by the reaction of precursor elemental carbon with molten silicon in situ. In the case of molten silicon infiltration, the infiltrate phase often comprises silicon carbide as well as residual unreacted silicon carbide, however, it is desirable to minimize these unreacted residual elements. Other silicon carbide composites may comprise an silicon carbide preform that is infiltrated by an infiltrate phase comprising a mixture of silicon carbide, $MoSi_2$ and residual silicon created by the reaction of precursor elemental carbon with a molten molybdenum-silicon alloy. Other infiltrate phases comprising silicon carbide can be made by infiltrating with many different silicon alloys. Other suitable methods of infiltration in the case of infiltrating a silicon carbide infiltrate phase may include for example polymer pyrolysis, chemical vapor infiltration (CVI) of a species that can then be used to form silicon carbide, metal-organic decomposition (MOD) or organo-metallic decomposition of species that produce silicon carbide, wet chemical infiltration of species that can be heat treated to produce silicon carbide and infiltration of slurries comprising discrete silicon carbide powder particles followed by heat treatment. Additionally, other useful structural ceramic composites of the present invention having a relatively small mismatch in the coefficients of thermal expansion between the interpenetrating phases may be possible, such as mullite/silicon carbide composites where the mismatch at 1000° C. is approximately $0.9 \times 10^{-6}$ in./in. °C.

In addition, referring to FIG. 1, it may be desirable to modify the ceramic preform prior to the step of infiltrating the infiltrate phase. One such modification in the case of silicon carbide ceramic composites is the addition of a coating 6 of a thin layer of a weak phase on the outer surface of the lamelli that inhibits sintering or bonding between the lamelli and the infiltrate phase. Such weak phase additions are known in the case of silicon carbide fiber reinforced CFCCs to provide integral crack deflecting interfaces between the fibers and the matrix. It is believed that in the case of silicon carbide ceramic preforms that materials such as boron nitride, silicon nitride, graphite and titanium boride may be used to provide such a layer. For preforms made from other ceramic materials, other coating materials may be desirable. These coatings may be added by any suitable method, such as CVD, liquid infiltration of a material that can be reacted to form the desired coating and others.

Finally, referring to FIG. 1, it may also be desirable to infiltrate a precursor material 8 within the interlamellar regions prior to the step of infiltrating the interlamellar regions with an infiltrate phase, so as to further control the composition or morphology of the resultant infiltrate phase. In the case of infiltration of a silicon carbide ceramic preform with molten silicon, the precursor material may be carbon, so as to promote the formation of an infiltrate phase comprising silicon carbide. Preferably, such a carbon precursor would be reacted to form a phase that is entirely silicon carbide; however, the degree of the reaction, the amount of carbon available and other factors may result in an infiltrate phase that is a mixture of silicon carbide, silicon and carbon. In the case of carbon precursors, they may be formed in many ways through chemical reduction of carbonaceous compound materials that have previously been infiltrated into the interlamellar region, such as by infiltration of a liquid resin followed by its pyrolysis or resin transfer molding (RTM) techniques, where the resin is pressurized to enhance the infiltration of the preform. Applicants believe that a wide variety of carbonaceous materials may be used for this purpose. One such material that has been used for this purpose is a mixture of 50 percent furfuryl alcohol resin (by weight) and 50 pitch. It may also be possible to provide carbon precursors by infiltration of the interlamellar regions with free carbon particles, such as by infiltration by a slurry. Further, it may also be possible to provide precursors such as silicon carbide particles, that only require sintering to form the infiltrate phase. Any precursor materials so utilized will be compatible with the material comprising the ceramic preform and the desired infiltrate phase.

Referring again to FIG. 1, an example of the method of the present invention in the case of a silicon carbide-based ceramic preform is described. The step of forming 2 these lamellar or fibrillar articles may be described by the steps of forming a liquid dispersion 10 by mixing silicon carbide ceramic particles 20 in a liquid medium (e.g. t-butanol, water, p-xylene, carbon tetrachloride or cyclohexane) 30, freezing the liquid dispersion 40 to form the ceramic particles 20 into a lamellar or fibrillar silicon carbide structure, removing the frozen liquid medium by freeze-drying 50, and sintering 60 the lamellar silicon carbide structure to form a porous, sintered, monolithic ceramic preform having a lamellar structure as described above. In this example, a sintering inhibiting layer is deposited 6 by deposition 70 of a ceramic coating on the surface of the lamelli (e.g. BN). A precursor material is infiltrated 8 by infiltration of a carbonaceous resin 80 (e.g. furfuryl alcohol/pitch mixture) into the interlamellar regions and pyrolysis of the resin 90. The interlamellar regions are then infiltrated with the infiltrate phase 4 by the introduction of molten silicon 100 into the interlamellar regions to react with the carbon and form a phase comprising silicon carbide and residual silicon.

The composite ceramics of the present invention thus described comprise a porous, sintered, monolithic ceramic preform having a plurality of interconnected lamelli that are partially separated from one another by complementary interlamellar regions; and an infiltrate phase formed in the interlamellar regions of the ceramic preform. The preform and the infiltrate may be described as interpenetrating phases. The present invention is now further described by means of several specific examples.

EXAMPLE 1

SiC Preform with Polysilane in Tertiary Butylalcohol

A dispersion of silicon carbide particles was prepared following a two step process, comprising steps A and B. Step A was performed by mixing the following ingredients in the given order in a Nalgene bottle with a stir bar:

| | |
|---|---|
| Step A: | B-76 Butvar[1] (polyvinyl butral) - 10 g (binder) |
| | t-Butanol - 145 g (liquid medium) |
| | Hamposyl-O[2] (oleoyl sarcosine) - 1 g (plasticizer) |
| | Paraplex G-30[3] (low molecular weight polyester) - 2.8 g (plasticizer) |
| | Emcol CC-42[4] (polypropoxylated quaternary ammonium chloride) - 2.7 g (dispersant) |
| | Polydimethylphenylpolysilane (1 g) in cyclohexane (6 g) - (binder) |
| | 1  B-76 is made by Monsanto Co. |
| | 2  Hamposyl is made by Grace Co. |
| | 3  Paraplex G-30 is made by C.P. Hall Co. |
| | 4  Emcol CC-42 is made by Witco |

Initially, the mixture was cloudy, but after 30 minutes to an hour, the cloudy mixture turned clear. This mixture was prepared fresh each time, as it has a tendency to gel over a period of time. The mixture of step A was utilized in step B to prepare a silicon carbide based dispersion or slurry. All the ingredients were added in the order shown below in a Nalgene bottle.

| | |
|---|---|
| Step B: | Zirconia (or WC) beads - 160 g (milling media) |
| | The solution from step A - 20.15 g (liquid medium plus additives) |
| | Boron powder - 0.4 g (sintering agent) |
| | HSC SiC, grade 059SS[5] (0.6 micron (ave.) SiC powder) - 24.8 g (ceramic particles) |
| | 5  HSC SiC is made by Superior Graphite |

The contents of Steps A and B of the bottle were shaken on a paint shaker for about half an hour. The slurry was deaired in vacuum, mixed in a slow ball mill and heated to 60° C. The heated slurry was poured into a 2" long, 0.2" wide, 1" high plexiglass mold that had a bottom metal plate that was adapted to be cooled with liquid nitrogen to provide a sharp thermal gradient, and induce directional solidification. In later experiments, t-butanol was heated and a small amount was poured first into the mold to freeze and thereby to provide nucleation sites for the solidification of the dispersion which was subsequently added. The result was a more uniform directional structure to the fibrils/lamelli formed during freezing. The dispersion was placed in a freeze-dryer (e.g. a freezer that could be controlled with respect to its pressure and temperature) and left to freeze at −40° C. After a few hours the dispersion had frozen, and the frozen dispersion was then freeze-dried at 60° C. and approximately 100 mtorr for 4–6 hours. After freeze-drying, the ceramic article, comprising a network of interconnected lamelli as described elsewhere herein, was removed from the mold and sintered at 2080° C. in a graphite furnace. The furnace was programmed from room temperature to 1800° C. at a rate of 40 C.°/min. and from 1800° C. to 2080° C. at a rate of 7 C.°/min., and then maintained at 2080° C. for 20 minutes. The sample went through a volume shrinkage of approximately 14–17% during sintering. After sintering the sample color had changed from dark green to black.

The result was a porous, sintered, ceramic preform comprised of substantially-interconnected, longitudinally-extending lamelli that were partially separated from one another by complementary, longitudinally-extending interlamellar regions. By substantially-interconnected, it is meant that the lamelli impinged upon and intersected one another in the transverse dimension as described above, but that not all the lamelli were interconnected. By longitudinally-extending, it is meant that the lamelli extended preferentially in a longitudinal dimension as described herein. This orientation is established by the directional solidification of the liquid medium. By partially separated, it is meant that the lamelli were partially separated from one another in the regions corresponding to the locations previously occupied by the frozen liquid medium. These regions were complementary to the lamelli, in that they comprised the longitudinally-extending interlamellar spaces wherein the liquid medium was previously frozen.

The outer surfaces of the plurality of lamelli that comprise the silicon carbide ceramic preform (including the outer surfaces of those lamelli that were on the interior of the preform) were then coated with a layer of boron nitride. The BN layer was deposited using known methods of CVD or CVI. The resultant BN layer was approximately 1–2 micrometers thick. The purpose of the BN layer is to prevent the sintering of the silicon carbide with a subsequently added infiltrate phase and to provide a weak interface between the silicon carbide preform phase and the infiltrate phase in the composite, so as to deflect any cracks that begin to propagate in either the ceramic preform or the infiltrate phase, and thus limit or prevent their propagation into the adjacent phase. The use of crack deflecting interfaces in ceramic materials is well-known as a means for toughening these materials. This means of toughening forms the basis for much of the work on ceramic composites. For example, the BN layer of the present invention is intended to function similarly to the layers, including BN, added at the interface between the ceramic fibers and ceramic matrix in a CFCC, where the coating layers are used for the same purpose.

To allow the plurality of lamelli of the ceramic preform to be wet by the subsequently added infiltrate phase, and thus provide a more fully dense ceramic article, a coating of pyrolytic carbon was added over the layer of BN. The carbon coating was made using well-known methods of CVD. The carbon coating resulted in approximately a 6.5% weight gain for the ceramic preform.

The desired infiltrate phase in this example was silicon carbide. The infiltrate phase was to be formed by the infiltration of liquid silicon into the ceramic preform. The silicon carbide was to be formed during the infiltration of the silicon by reaction with carbon. In order to form the desired quantity of silicon carbide, it was necessary to provide a sufficient amount of carbon to react with the silicon during the infiltration. It was desired to provide more carbon for reaction than was provided by CVD, therefore, more carbon was added by infiltration of a carbonaceous liquid resin and its subsequent pyrolysis to form an additional quantity of carbon residue in the interlamellar regions of the preform. The carbonaceous resin was a polymeric furfuryl alcohol based resin. The sintered preform was soaked in a furfuryl alcohol based resin mixture overnight, and then dried and polymerized at 100° C. overnight. The resin mixture comprised 50 volume percent of Durez, the tradename of a furfuryl alcohol based resin made by Oxchem Co., and 50 volume percent of Cotronics, the tradename of another furfuryl alcohol based resin made by Cotronics Co. The polymer infiltrated preforms were then pyrolyzed at 500° C. for ½–2 hrs to chemically reduce the polymer to a carbon residue. The furnace was programmed from room temperature to 500° C. at a rate of 40 C.°/min. This resulted in an additional weight gain in the ceramic preforms of approximately 12.5%, attributable to the presence of free carbon in the interlamellar regions resulting from pyrolysis of the resin mixture.

Figure 3:
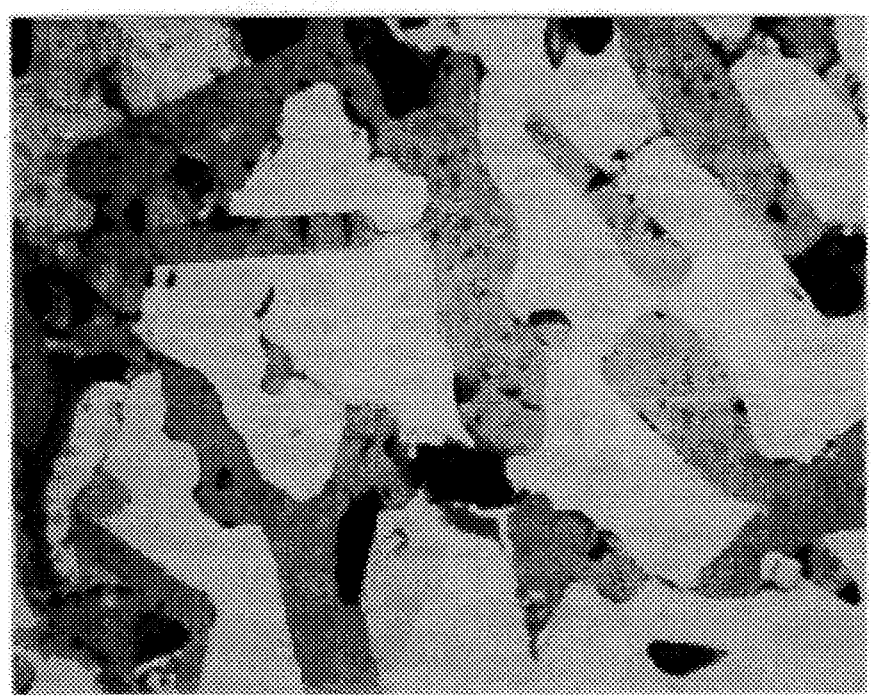
FIG. 3 is an optical photomicrograph of an Si—SiC (infiltrate phase)/SiC (preform) composite ceramic article of the present invention taken at a magnification of 500×.

The ceramic preforms were then infiltrated with liquid silicon. The infiltration was done by heating the ceramic preform in a graphite boat lined with carbon wick and coated with boron nitride, and filled with small pieces of silicon, such that the silicon surrounded the ceramic preform. This combination was heated to about 1450° C. in an argon atmosphere for 15 minutes. The silicon was melted and infiltrated the ceramic preform to react with the carbon that had been deposited in the interlamellar regions. The furnace used for the infiltration was ramped from room temperature to 500° C. at a rate of 8 C.°/min (approximately 1 hr.), and then ramped from 500° C. to 1450° C. in 2 hrs. The carbon reacted with the molten silicon to form some silicon carbide with significant amounts of residual silicon. Therefore, Applicants believe that it is desirable to increase the amount of precursor carbon in the interlamellar regions to increase the quantity of silicon carbide and reduce the amount of residual silicon. The final composite exhibited a weight gain of 120.7%. Since the density of silicon carbide of the sintered ceramic preform is greater than the density of the silicon/silicon carbide infiltrate phase, this indicates that the porosity of the ceramic preform, attributable in large part to the interlamellar regions, was greater than 50%. The photomicrograph of the resultant self-reinforced composite is shown in FIG. 3. FIG. 3 is a cross-section of the silicon-infiltrated ceramic preform taken roughly perpendicular to the growth direction of the lamelli that comprised the original ceramic preform, thus the section shows the transverse dimension of the lamelli. The photomicrograph clearly shows the cross-sections of the interpenetrating phases, with the silicon carbide lamelli appearing as the darker phase. The lighter phase is the silicon/silicon carbide infiltrate phase. Applicants also observed that the silicon carbide of the ceramic preform (that utilized a polysilane binder) appeared to be denser than the silicon carbide structures that resulted in samples made without the use of polysilane binders.

EXAMPLE 2

SiC Composite from Aqueous Slurry

An aqueous silicon carbide slurry was prepared by mixing the following ingredients in the given order:

WC beads—160 g (milling media)
HSC SiC, grade 059SS [1] (0.6 microns (ave.) SiC powder) —280 g (ceramic particles)
De-ionized water—180 g (liquid medium)
Boron powder—0.3 g (sintering agent)
Sucrose—6.0 g (binder)
Glycerin—2.0 g (binder
Polyfon-H[2] (sodium lignosulphonate—1.0 g (dispersant)
Triton X-100[3] (octylphenoxy polyethoxy ethanol)—0.01 g (dispersant)
Tetramethyl ammonium hydroxide (TMAH)—75 drops (pH adjuster/dispersant)

[1] HSC SiC is made by Superior Graphite
[2] Polyfon-H is made by Westvaco
[3] Triton X-100 is made by Rohm & Haas The slurry preparation of Example 1 was repeated in this example. However, in this experiment TMAH was used to adjust the pH of the mixture to 10. The addition of TMAH (ionic dispersant) had a strong dispersive effect on the silicon carbide particles in the dispersion and permitted the dispersion to be easily poured into the mold for freeze-drying. The steps following the slurry preparation of Example 1 were also repeated including: freeze drying, sintering, BN coating, pyrolytic carbon coating, resin infiltration, pyrolysis and liquid silicon infiltration.

Figure 4A:
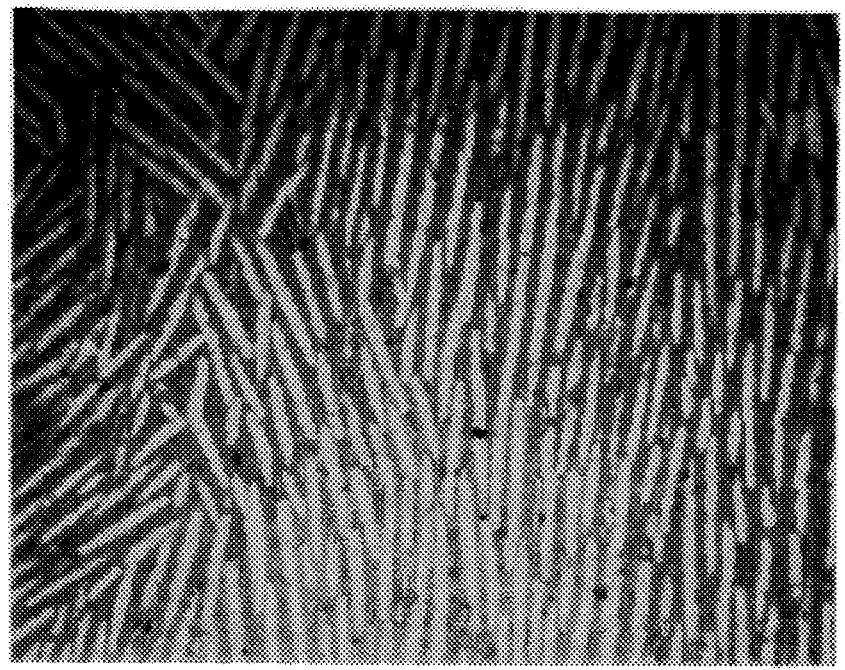
FIG. 4A is an optical photomicrograph of an Si—SiC (infiltrate phase)/SiC (preform) composite ceramic article of the present invention taken at a magnification of 50× and revealing the ordering of the SiC lamelli (dark phase) of the original preform in the transverse dimension.
Figure 4B:
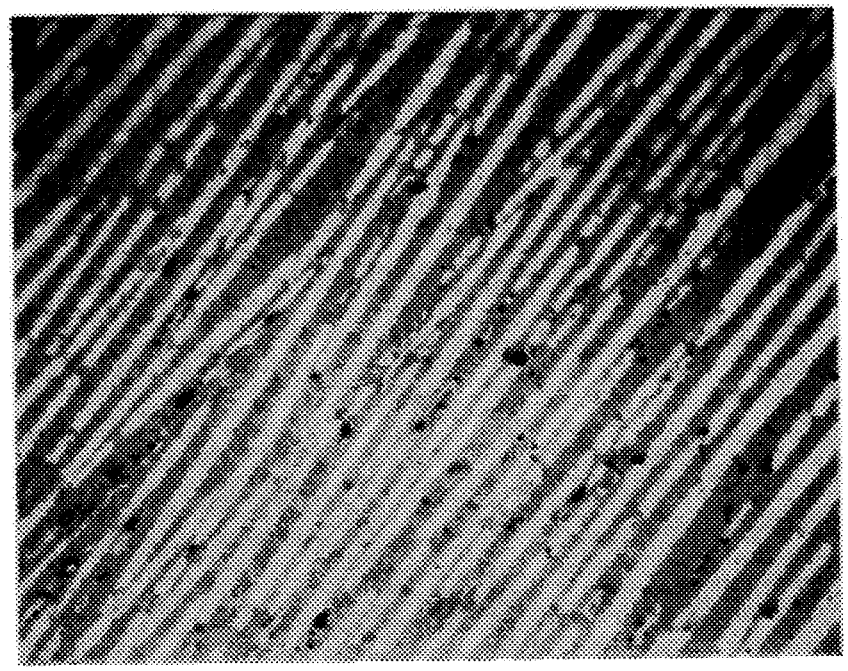
FIG. 4B is an optical photomicrograph of the composite ceramic article of FIG. 4A taken at a magnification of 50× and revealing the ordering of the SiC lamelli (dark phase) of the original preform in the longitudinal dimension.

The photomicrograph of the resultant self-reinforced silicon carbide composite is shown in FIGS. 4A and 4B. FIG. 4A is a cross-section taken in the transverse dimension through the ceramic article, such that it reveals the transverse cross-section of the individual lamelli as the dark phase and the silicon/silicon carbide phase as the lighter phase. FIG. 4B is a cross-section of the same ceramic article as shown in FIG. 4A taken in the longitudinal dimension through the ceramic article, such that it reveals the longitudinal cross-section of the individual lamelli. By comparison with the microstructure of the ceramic article shown in FIG. 3, Applicants determined that the lamelli formed from the aqueous slurry were coarser than the lamelli formed from the t-butanol slurry. In addition, the lamelli formed in the aqueous slurry were more directionally ordered as compared to the lamelli formed from the t-butanol slurry.

EXAMPLE 3

SiC Composite from Aqueous Slurry with Improved Resin Infiltration

Figure 5:
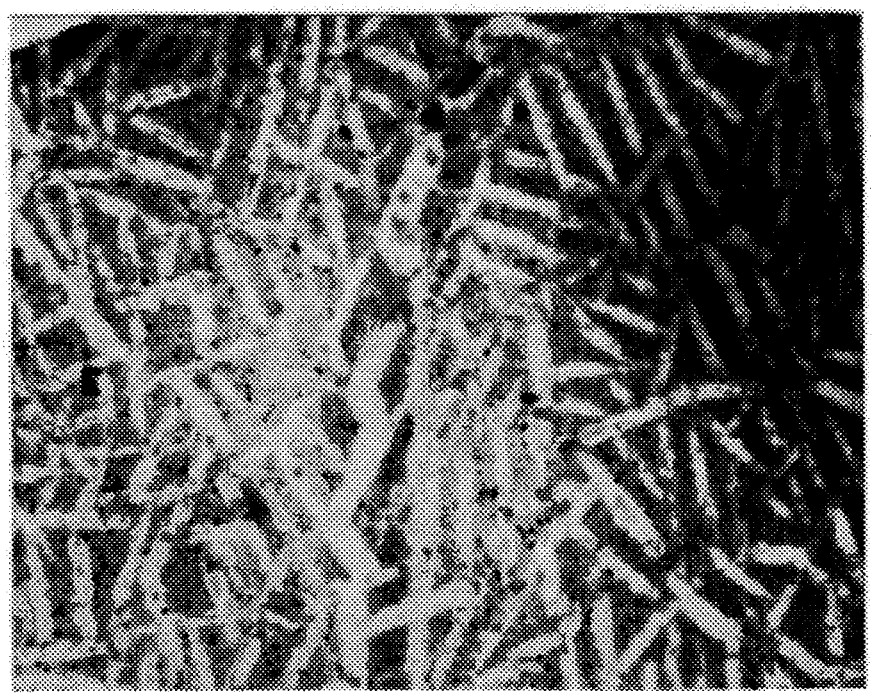
FIG. 5 is an optical photomicrograph of a third Si—SiC (infiltrate phase)/SiC (preform) composite ceramic article of the present invention taken at a magnification of 50×, revealing the ordering of the SiC lamelli (dark phase) of the original preform in the transverse dimension as well as the presence of distinct SiC particles that have been formed in the primarily Si (lighter) phase.

The sample composition and preparation was similar to that of Examples 1 and 2, except that the composition of the resin and the resin infiltration step was modified. The objective was to increase the amount of carbon residue in the interlamellar regions of the silicon carbide preform, so as to increase the amount of silicon carbide formed during the liquid silicon infiltration. The silicon carbide preform was infiltrated with a carbonaceous resin mixture comprising furfuryl alcohol resin and pitch under pressure in an autoclave. Pressure was utilized in an attempt to force more of the resin to infiltrate into the interlamellar regions of the ceramic preform than occurred using the method of Example 2. The resin mixture was altered from that used in Example 2 by the addition of pitch, in an attempt to increase the quantity of carbon residue remaining after pyrolysis. The furfuryl alcohol resin was a combination of the materials Durez and Cotronics described above. The pitch was a coal distillate made by Allied Signal. The resin comprised Durez-:Cotronics:Pitch in the weight percentages of 25:25:50, respectively. A ceramic preform was immersed in the resin mixture and subjected to 4 cycles of vacuum (<1 min.) and 100 psi pressure (<1 min.) in the autoclave for 3 hours. It was heated to 150° C. followed by pressurization to 1000 psi with air for 24 hours in the autoclave. To prepare the silicon carbide composite, the pyrolysis and silicon melt infiltration steps of Example 2 were followed. The microstructure of the resultant composite ceramic article is shown in FIG. 5. In FIG. 5, the lamelli of the darker phase is the plurality silicon carbide lamelli of the ceramic preform. The lighter phase is silicon from the silicon infiltration. The dark phase particles found in the midst of the lighter phase is silicon carbide formed by reaction of the carbon residue with the silicon during the silicon infiltration. As measured by Applicants and observable in FIG. 5, approximately 30% of the volume of the silicon/silicon carbide phase that results from the silicon infiltration comprises silicon carbide particles formed by reaction between the carbon residue and the liquid silicon. This is greater than the amount of silicon carbide that was formed from the carbon residue in Example 2. Therefore, it will be apparent to those familiar with the ceramic arts, that these and other means may be employed to vary the quantity of the carbon residue available for reaction with the silicon in the case where it is desired to form silicon carbide as part of the infiltrate phase The examples set forth herein have been directed toward the development ceramic composites of silicon carbide, however, it will be apparent to those of skill in the ceramic arts that the present invention is not limited to silicon carbide ceramic composites, and that many other ceramic composites may be formed using the methods generally described herein.

What is claimed is:

1. A method for making a composite ceramic article having a ceramic preform and an infiltrate phase, comprising the steps of:

directionally solidifying by freezing a liquid medium containing a dispersion of ceramic particles to produce a green, porous ceramic preform wherein the dispersion is cooled to a temperature below a freezing point of the liquid medium for a time sufficient to cause directional solidification within the liquid medium and progressive segregation of the liquid medium from the dispersion, wherein the directional solidification and segregation of the liquid medium causes a morphological ordering of a plurality of the ceramic particles into a plurality of interconnected lamelli or fibrils or mixtures thereof that are partially separated from one another by complementary interlamellar regions that form a green freeze dried ceramic preform;

removing the solidified liquid medium from said preform;

sintering the green freeze dried ceramic preform at a temperature and for a time sufficient to cause the plurality of ceramic particles to become bonded to one another; and infiltrating the interlamellar regions of the sintered ceramic preform with an infiltrate phase.

2. A method for making a composite ceramic article, comprising the steps of:

directionally solidifying by freezing a liquid medium containing a dispersion of ceramic particles to produce a green porous ceramic preform comprising a plurality of interconnected lamelli that are partially separated from one another by complementary interlamellar regions, removing the solidified liquid medium and sintering the ceramic preform;

coating the plurality of lamelli with a thin ceramic layer prior to a step of infiltrating the interlamellar regions, wherein the thin ceramic layer covers the plurality of lamelli and later inhibits bonding between the plurality of lamelli and an infiltrate phase during the step of infiltrating the interlamellar region; and infiltrating the interlamellar regions with the infiltrate phase.

3. The method of claim 2, wherein the ceramic layer comprises at least one ceramic compound from the group consisting of boron nitride, silicon nitride, graphite and titanium boride.

4. The method of claim 2, further comprising the step of infiltrating the interlamellar regions and coating the thin ceramic layer covering the lamelli with carbon.

5. The method of claim 4, wherein the ceramic preform comprises SiC and the infiltrate phase comprises molten Si or $MoSi_2$, wherein the silicon in the molten Si or $MoSi_2$ reacts with the carbon to form silicon carbide.

6. The method of claim 2, further comprising the steps of:

infiltrating the interlamellar regions and coating the thin ceramic layer covering the lamelli with a carbonaceous compound;

chemically reducing the carbonaceous compound to produce a carbon residue on the lamelli.

7. The method of claim 6, wherein the ceramic preform comprises SiC and the infiltrate phase comprises molten Si or $MoSi_2$, wherein the silicon in the molten Si or $MoSi_2$ reacts with the carbon to form silicon carbide.

8. A method of making a composite ceramic article, comprising the steps of:

forming a porous, sintered ceramic preform by the steps comprising: forming a colloidally stabilized liquid dispersion comprising a plurality of ceramic particles and a liquid medium, wherein the ceramic particles are at least temporarily dispersed within the liquid medium; cooling the dispersion to a temperature below a freezing point of the liquid medium for a time sufficient to cause the directional solidification of the liquid medium and progressive segregation of the liquid medium from the dispersion, wherein the directional solidification and segregation of the liquid medium causes the morphological ordering of the plurality of the ceramic powder particles into a structure comprising a plurality of interconnected lamelli that are partially separated from one another by complementary interlamellar regions; removing the frozen liquid medium; and heating the article at a temperature and for a time sufficient to cause the plurality of ceramic particles to become sintered to one another, and infiltrating the interlamellar regions with an infiltrate phase.

9. A method of making a composite ceramic article, comprising the steps of:

forming a porous, sintered ceramic preform by the steps comprising: forming a colloidal stabilized liquid dispersion comprising a plurality of ceramic particles and a liquid medium, wherein the ceramic particles are at least temporarily dispersed within the liquid medium; cooling the dispersion to a temperature below a freezing point of the liquid medium for a time sufficient to cause the directional solidification of the liquid medium and progressive segregation of the liquid medium from the dispersion, wherein the directional solidification and segregation of the liquid medium causes the morphological ordering of the plurality of the ceramic powder particles into a structure comprising a plurality of interconnected lamelli that are partially separated from one another by complementary interlamellar regions; removing the frozen liquid medium; and heating the article at a temperature and for a time sufficient to cause the plurality of ceramic particles to become sintered to one another;

coating the plurality of lamelli with a thin ceramic layer prior to a step of infiltrating the interlamellar regions, wherein the thin ceramic layer substantially inhibits sintering between the plurality of lamelli and said infiltrate phase and is more susceptible to propagation of a crack than either said ceramic preform or said infiltrate phase; and infiltrating the interlamellar regions with an infiltrate phase.

10. The method of claim 9, wherein the thin ceramic layer comprises at least one ceramic compound from the group consisting of boron nitride, silicon nitride, graphite and titanium boride.

11. The method of claim 9, further comprising the addition of a dispersant during the step of forming the dispersion.

12. The method of claim 9, further comprising the addition of a binder to the dispersion.

13. The method of claim 12, wherein the binder is carbonaceous.

14. The method of claim 13, wherein the binder comprises a compound from the group consisting of polycarbosilane-containing compounds and polysilazane-containing compounds.

15. The method of claim 9, wherein the step of cooling the dispersion comprises adding the dispersion to a quantity of previously frozen liquid medium so as to provide pre-existing nucleation sites at which the freezing of the liquid medium within the dispersion may begin, wherein the morphological ordering of the particles develops more uniformly.

16. The method of claim 9, wherein the step of cooling the dispersion comprises heating the dispersion prior to cooling so as to develop greater thermal gradients within the dispersion upon cooling.

17. The method of claim 9, further comprising the step of infiltrating the interlamellar regions and coating the thin ceramic layer covering the lamelli with carbon.

18. The method of claim 17, wherein the ceramic preform comprises SiC and the infiltrate phase comprises molten Si or $MoSi_2$, wherein the silicon in the molten Si or $MoSi_2$ reacts with the carbon to form silicon carbide.

19. The method of claim 9, further comprising the steps of:

infiltrating the interlamellar regions and coating the thin ceramic layer covering the lamelli with a carbonaceous compound;

chemically reducing the carbonaceous compound to produce a carbon residue on the lamelli.

20. The method of claim 19, wherein the ceramic preform comprises SiC and the infiltrate phase comprises molten Si or $MoSi_2$, wherein the silicon in the molten Si or $MoSi_2$ reacts with the carbon to form silicon carbide.

* * * * *